United States Patent [19]
Gryp

[11] Patent Number: 5,769,496
[45] Date of Patent: Jun. 23, 1998

[54] ADJUSTABLE ARMREST APPARATUS

[75] Inventor: Dennis J. Gryp, East Moline, Ill.

[73] Assignee: Sears Manufacturing Company, Davenport, Iowa

[21] Appl. No.: 807,064

[22] Filed: Feb. 27, 1997

Related U.S. Application Data

[63] Continuation-in-part of Ser. No. 613,416, Mar. 11, 1996.

[51] Int. Cl.[6] .................................................. A47C 7/54
[52] U.S. Cl. ................................. 297/411.32; 297/411.38
[58] Field of Search ........................ 297/411.32, 411.35, 297/411.38, 411.37, 188.19

[56] References Cited

U.S. PATENT DOCUMENTS

| | | | |
|---|---|---|---|
| 3,489,458 | 1/1970 | Karlsen | 297/411.37 |
| 3,993,350 | 11/1976 | McFarlane . | |
| 4,097,088 | 6/1978 | Meiller | 297/411.35 X |
| 4,400,033 | 8/1983 | Pietsch . | |
| 4,906,044 | 3/1990 | Wilstermann | 297/188.19 X |
| 5,188,423 | 2/1993 | Meiller et al. | 297/411.37 |

FOREIGN PATENT DOCUMENTS

| | | | |
|---|---|---|---|
| 2170099 | 7/1986 | United Kingdom | 297/411.32 |

*Primary Examiner*—Peter R. Brown
*Attorney, Agent, or Firm*—Niro, Scavone, Haller & Niro

[57] ABSTRACT

An adjustable armrest assembly for a seat including a shaft mounted to and extending laterally from the seat and having a stop member, and an armrest frame rotatably mounted on the shaft to permit limited rotation of the frame on the shaft and a rotatable actuator in conjunction with the frame and a rod actuatable by the actuator to act on the stop member to adjust the positioning and degree of rotation of the frame about the shaft. The armrest preferably includes a compartment within the armrest frame and a cover with a gel or foam pad, or other cushioning, hinged to the frame.

9 Claims, 3 Drawing Sheets

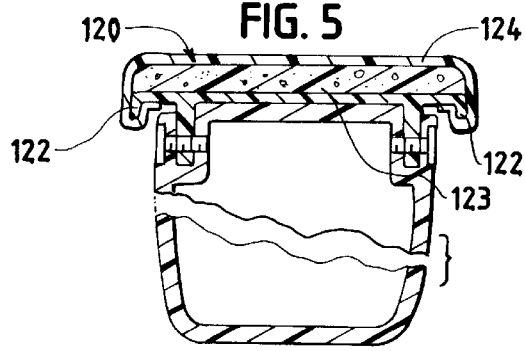
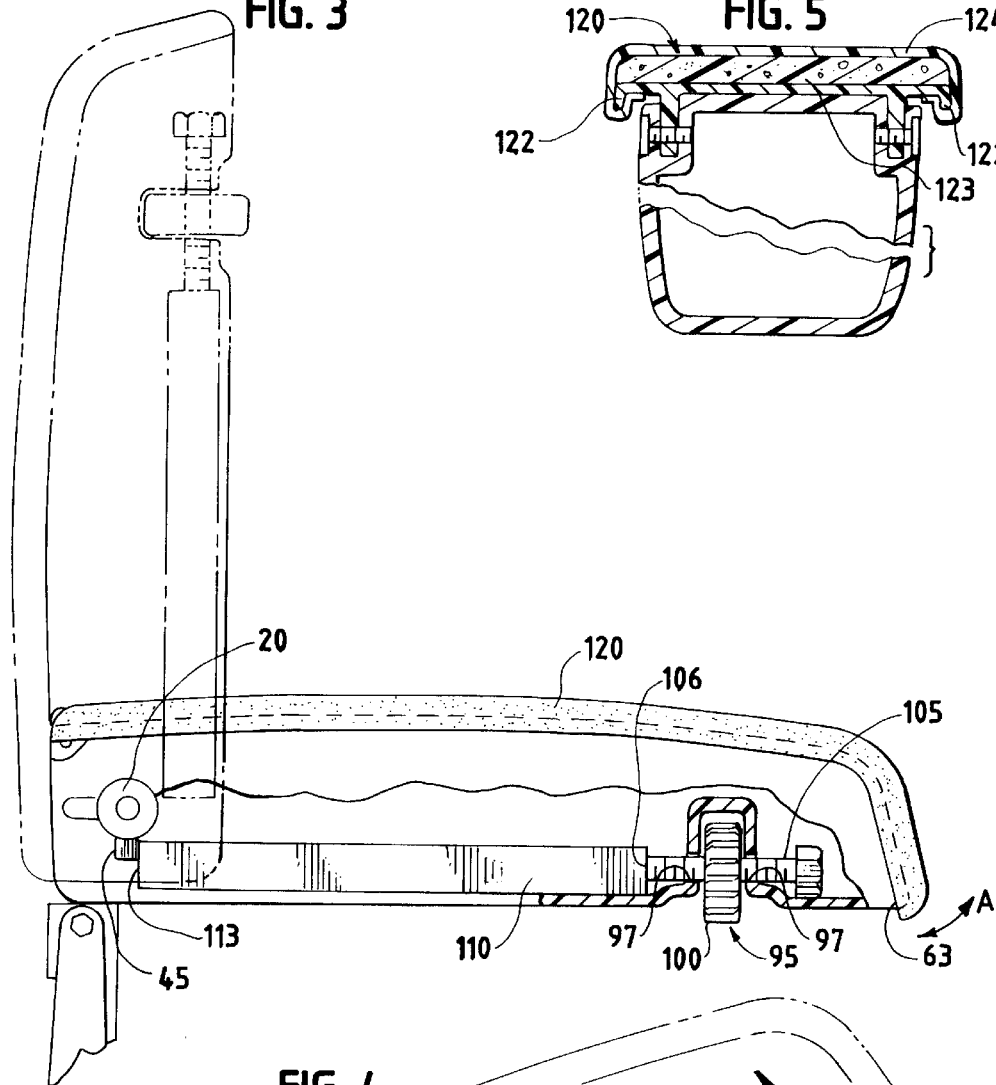
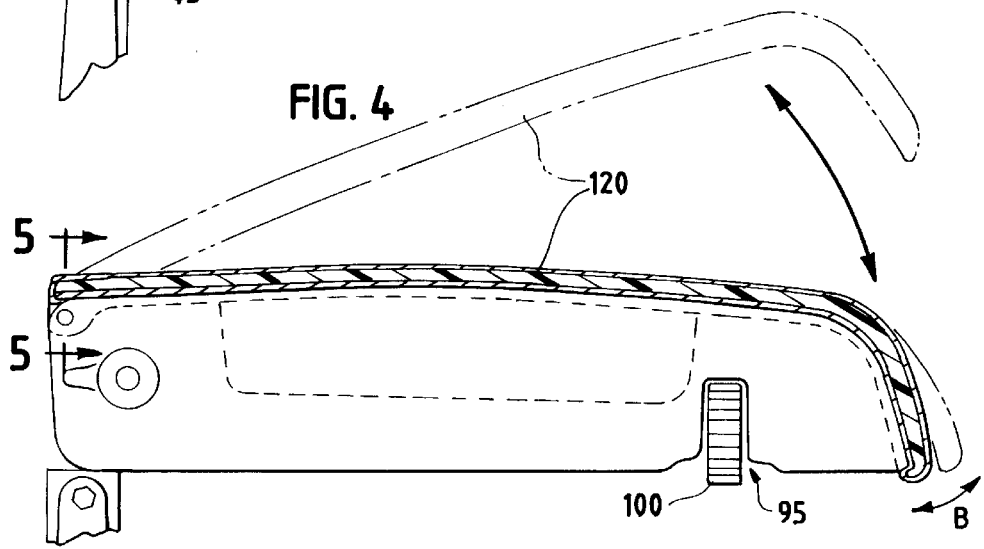

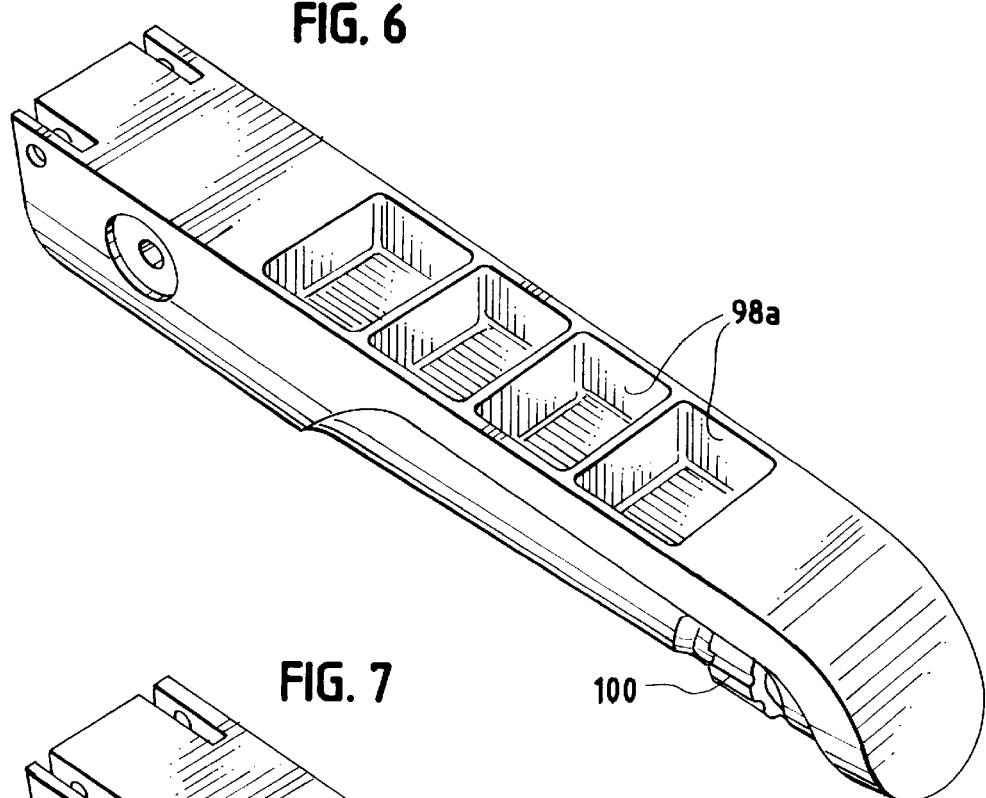
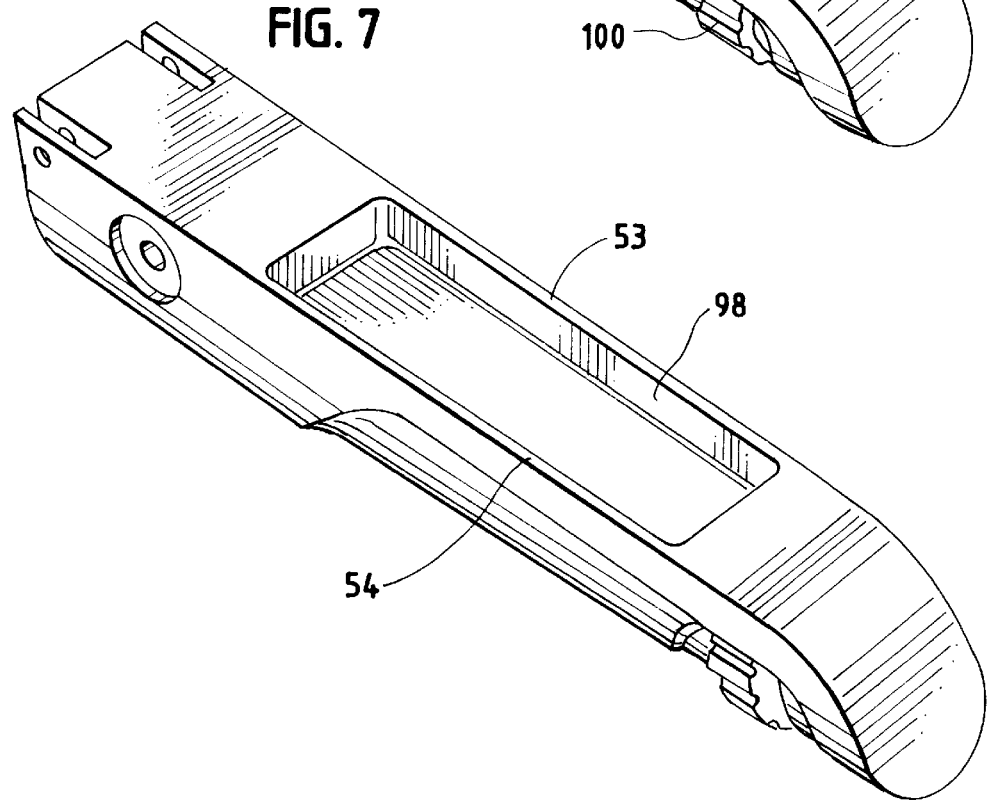

ADJUSTABLE ARMREST APPARATUS

This is a continuation-in-part application of Ser. No. 08613,416, filed Mar. 11, 1996.

BACKGROUND OF THE INVENTION

The present invention relates to an armrest assembly and, more specifically, to an adjustable armrest for use with vehicle seats.

Seats with armrests are well known in the art. Vehicle seats with armrests provide desired comfort for long trips. Additionally, adjustable armrests allow convenient entry and exit from the vehicle seat, and provide additional comfort by allowing the seat occupant to adjust his or her posture as desired.

Currently utilized adjustable armrests vary considerably. Most are believed to be designed to be secured in one form or another to a seat frame and to be used with an upholstered seat. Fabrication and assembly of such armrests can be time-consuming, complicated and costly.

The present invention solves the problems associated with these prior art armrests while preserving their attendant benefits. The present invention provides an adjustable armrest structure which allows greatly simplified manufacture, assembly and use without the disadvantages of the prior art. The present invention provides an armrest having increased adjustability, versatility and durability. The design of the adjustable armrest of the present invention also provides a sturdy configuration which resists radially directed forces applied to the armrest shaft when, for example, a user grabs the armrest to pull himself or herself into the vehicle.

SUMMARY OF THE INVENTION

In accordance with the present invention, an adjustable arm rest assembly is provided having a shaft that extends laterally from the seat, a stop member located in a fixed position on the shaft, an armrest frame rotatably mounted on the shaft, and an actuator rotatably coupled to the frame and a rod positioned to engage the stop member to cause limited rotation of the armrest frame on the shaft. The actuator is preferably located at a distal end of the frame to allow convenient, single-handed adjustment by an operator. Also, in a preferred embodiment, the frame includes a soft, gel or foam pad cover which is hinged to conceal a compartment formed in the armrest frame.

The primary object of the present invention is to provide an adjustable armrest which is simple in construction and easy to assemble to a seat.

Another object of the present invention is to provide an adjustable armrest which can be simply mounted to either side of a seat.

An even further object of the present invention is to provide a simplified adjustable armrest structure which utilizes standard assembly connectors for inexpensive manufacture.

A still further object of the present invention is to provide an adjustable armrest which is conveniently adjustable by an operator at a distal end of the armrest.

Yet another object of the present invention is to provide an adjustable armrest having a compartment for storage or the like and a soft cover for operator comfort.

DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 3 is a side, cutaway view of the adjustable armrest of the present invention showing the armrest in a horizontal position and in a rotated vertical position.

FIG. 4 is a side view of the present invention showing the hinged cover.

FIG. 5 is a cross-sectional view of the cover and frame of the adjustable armrest of the present invention along the line 5—5 of FIG. 4.

FIG. 6 is a perspective view of the adjustable armrest of the present invention showing compartments within the armrest frame.

FIG. 7 is a perspective view of the adjustable armrest of the present invention showing a single compartment within the armrest frame.

DETAILED DESCRIPTION OF THE PREFERRED EMBODIMENT

Figure 1:
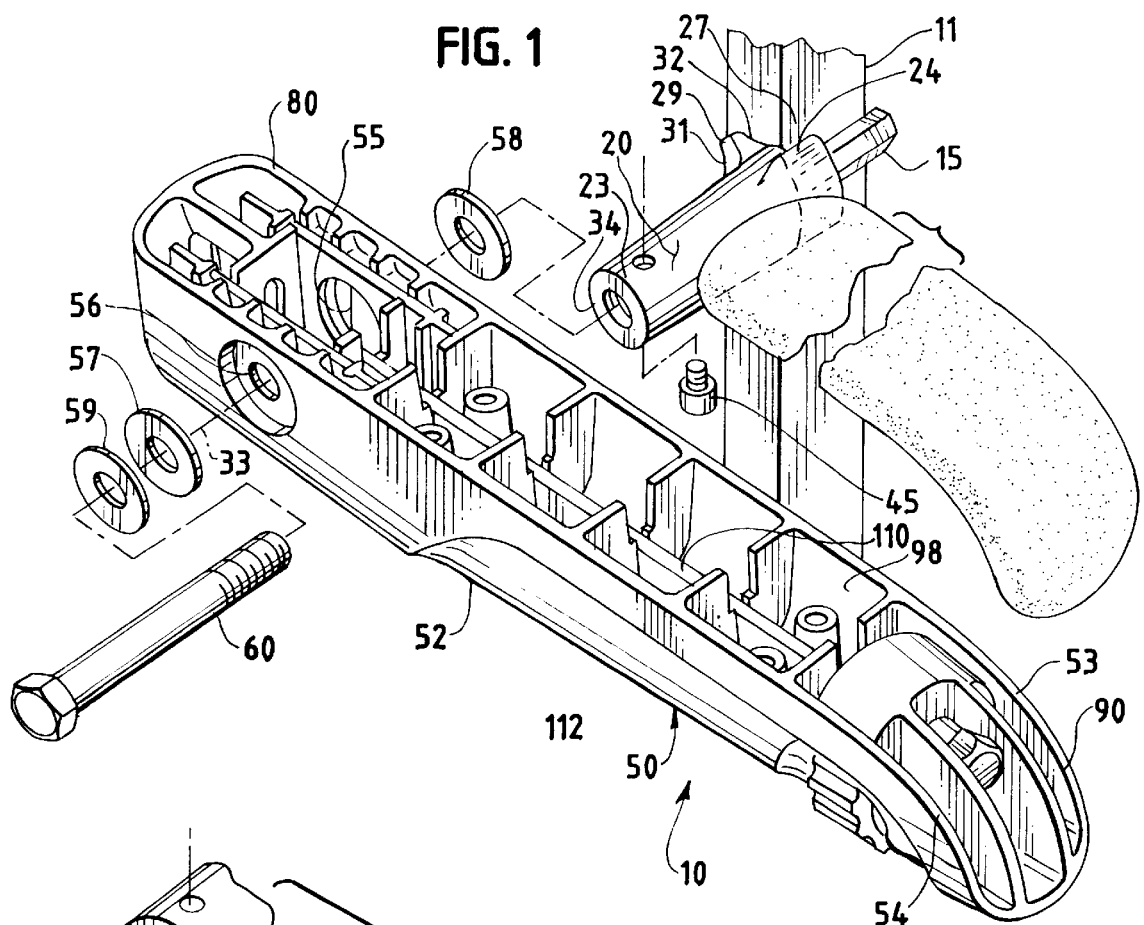
FIG. 1 is a perspective, exploded view of the adjustable armrest of the present invention.
Figure 2:
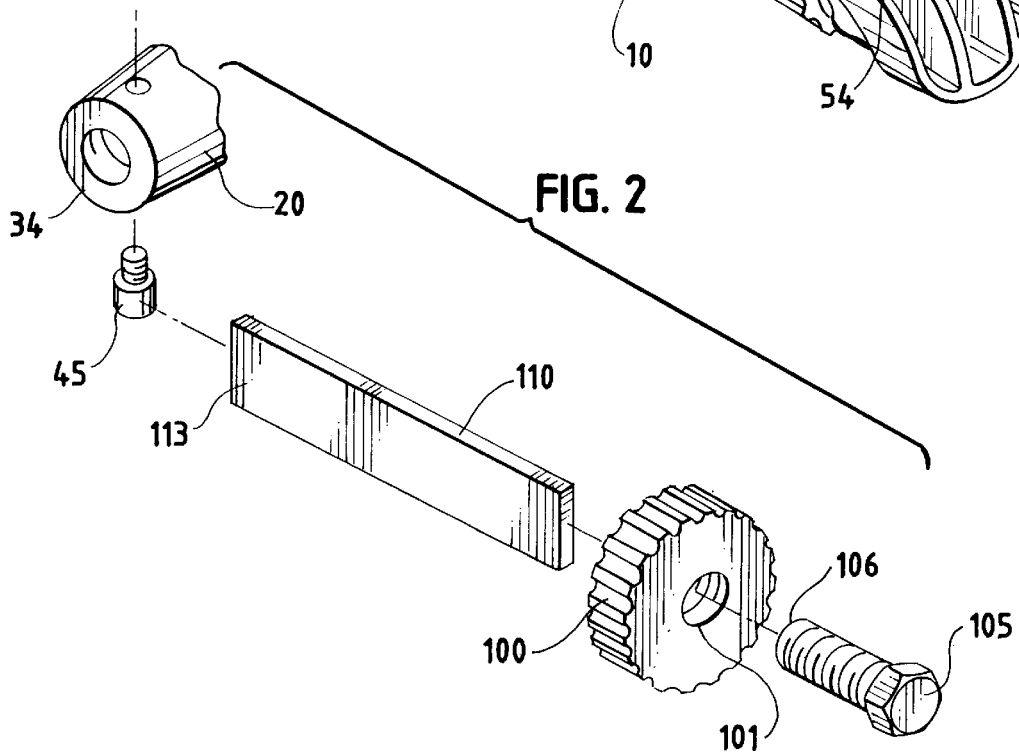
FIG. 2 is a perspective, partial exploded view of the adjustment mechanism of the armrest of the present invention.

As seen in FIG. 1, and as designated generally 10, an adjustable armrest is provided to be mounted to a seat frame 11. Seat frame member 11 is shown in a generally vertical position in FIG. 1. A conventional internally threaded fastener or nut 15 is welded or otherwise fixedly secured to frame 11. A pivot bar or shaft 20 is designed to extend coaxially over nut 15. Shaft 20 has a distal portion 23 which communicates with armrest frame 50, and base portion 24 which communicates with frame 11. The distal portion 23 is substantially cylindrical while the base portion 24 includes an axially extending flat or planar surface 27 that faces against frame 11. Extending from shaft 20 is radially extending flange 29 having sloped surface 31 and face 32 abutting frame 11. A stop 45 is threaded into the distal portion 23 of shaft 20. In the preferred embodiment the stop 45 is a radially protruding threaded pin.

Reference is made herein to armrest frame 50 mounted on the right side of seat frame 11. The description is identical for the armrest mounted on the left side of a seat.

In operation, shaft 20 coaxially houses nut 15. Planar surfaces 27 abut frame 11 and thus stabilize hub 20 against frame 11. Face 32 of flange 29 also abuts frame 11 thereby positioning the shaft relative to the frame. Face 32 also provides a reinforcing structure to resist radial forces exerted upon shaft 20 when, for example, an occupant of the seat leans down on the armrest, or uses armrest frame 50 to get into the vehicle.

Armrest frame 50 has bottom 52, and sides 53 and 54. Frame 50 has proximal end 80 and distal end 90. Sides 53 and 54 and bottom 52 define a channel 98 (FIG. 7). Channel 98 may be used for storage or otherwise. Further, channel 98 may be segmented into compartments 98a as shown in FIG. 6.

The inner side 53 of proximal end 80 of armrest frame 50 has an aperture 55 for receiving shaft 20 and the outer side 54 has smaller aperture 56, each sharing a common center point. The width of armrest frame 50 is such that pin 45 is located substantially along the center line of the armrest frame 50. A polypropylene washer 58 is disposed between annular planar surface 34 of shaft 20 and sidewall 54. A bolt 60 extends through a second polypropylene washer 59, metal washer 57, smaller aperture 56, washer 58, shaft 20, and threadedly engages nut 15. Bolt 60 thus secures the armrest assembly to frame 11 and defines an axis of rotation 33 of armrest 50. Preferably, bolt 60 includes a locking polyurethane patch of the type produced by Nylok Fastener Corporation of Macomb, Michigan. Polypropylene washers 58 and 59 reduce friction between inner sidewall 54 of armrest frame 50 and planar surface 34 of shaft 20. By this attachment means, armrest frame 50 is free to rotate around shaft 20.

As explained, armrest frame 50 is rotatably secured to seat frame 11. In normal operation, armrest 50 will have an operating position which, for purposes of this invention, is that generally horizontal position at which a seat occupant has use of the structure as an armrest. As seen in FIG. 3, armrest 50 also has a rotated position which, as defined herein, is a generally vertical position. As armrest frame 50 rotates, shaft 20 and stop 45 remain in fixed position relative to frame 11.

As best seen in FIG. 3, frame 50 includes substantially arcuate indentation 95 near its distal end 90. Indentation 95 includes coaxial apertures 97 therein. Situated within indentation 95 is knob 100. Knob 100 has central threaded aperture (not shown), coaxially aligned with apertures 97 in indentation 95. Bolt 105 threadedly engages the knob aperture such that turning knob 100 causes bolt 105 to move fore or aft. Bolt 105 terminates at surface 106. Surface 106 contacts rod 110 situated within slots 112 (FIG. 1) within frame 50. Rod 110 terminates at a rearward end 113 which abuts stop 45 of shaft 20. Thus, stop 45 acts as the means to prevent downward rotation of frame 50 about shaft 20. Rotating knob 100 causes rod 110 to act on stop 45 which causes armrest frame 50 to rotate. As will be appreciated, armrest frame 50 can be freely rotated upward at anytime to the vertical position, as seen in FIG. 3, to allow easy egress from the seat.

As will be appreciated, the present invention facilitates assembly of an adjustable armrest utilizing a wide range of sizes of armrest frame 50. Additionally, in a preferred embodiment, seat frame 11 is cushioned and upholstered. When an armrest frame 50 is assembled to an upholstered seat frame 11, the cushioning of seat frame 11 is slightly compressed against the armrest frame 50. This compression provides a frictional inertia such that armrest frame 50 will not freely rotate, or bounce. As is readily apparent, the length of hub 20 can be appropriately altered for various sizes and widths of seat frames and armrest structures and respective cushioning dimensions to provide the appropriate cushion compression and rotational coupling.

In another preferred embodiment, frame 50 includes a hinged cover 120. As best seen in FIGS. 4 and 5, cover 120 has depending flange 122 along its entire periphery except its rear edge. Flange 122 is designed to fit snugly around sides 53 and 54 of frame 50. Cover 120 is relatively rigid to support the weight of a seat occupant but sufficiently resilient that flange 122 snapfits to frame 50. Front edge 63 of frame 50 mates snugly with front flange 122 of cover 120 in a snap-fit relationship as best seen in FIG. 4 and shown by arrow B. Cover 120 is hinged in the rear to frame 50. Cover 120 thereby covers channel 98 in frame 50 and allows convenient access to the storage area defined by channel 98.

In a further preferred embodiment as seen in FIG. 5, cover 120 includes padding 123 and a fabric wrap 124. Padding 123 can be foam or, preferably, a gel pad. Fabric 124 can be attached to cover 120 by any suitable means such as staples or the like.

Furthermore, the armrest structure of the present invention facilitates greatly simplified assembly. In manufacture, nut 15 is welded to seat frame 11. Seat frame 11 is then cushioned and upholstered. Armrest frame 50 is forged and cushioned. To assemble armrest frame 50 to seat frame 11, a manufacturer, dealer or consumer need only slit the upholstery and cushion of seat frame 11 adjacent coupling nut 15, slide hub 20 onto coupling nut 15, and slide pivot pin 60 into and through armrest frame 50, hub 20, and coupling nut 15. Moreover, removal and replacement of the armrest from the seat is equally simple.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. An adjustable armrest assembly mounted to a seat having a frame comprising:

a shaft having two ends mounted to and extending laterally from the seat frame, the shaft including at least one stop member and one end of the said shaft having a plurality of longitudinally extending surfaces abutting the seat frame to resist radially directed forces applied to said shaft;

an armrest frame rotatably mounted on the shaft and including stop engaging means to permit limited rotation of the armrest frame on the shaft, the frame having a distal end;

an actuator positioned proximate the distal end;

a rod disposed between the actuator and the shaft engageable with the stop member whereby the actuator can be operated to limit rotation of the frame about the shaft and for adjusting the degree of rotation of the armrest frame on the shaft.

2. The adjustable armrest assembly of claim 1 wherein:

the actuator has an axis of rotation comprising a threaded aperture and the rod threadedly engages the aperture.

3. The adjustable armrest assembly of claim 1 wherein the actuator is positioned within the frame.

4. The adjustable armrest assembly of claim 1 wherein the actuator is positioned to be actuated by the thumb and any finger of an occupant in said seat.

5. The adjustable armrest assembly of claim 1 further comprising a bolt operably engaging the actuator to act on said rod.

6. The adjustable armrest assembly of claim 1 wherein the frame is generally U-shaped in vertical, transverse cross-section defining a compartment and includes a cover rotatably hinged thereto to enclose said compartment.

7. The adjustable armrest assembly of claim 6 wherein said cover comprises a body having a top portion which top portion includes a gel pad.

8. The adjustable armrest assembly of claim 6 wherein said cover comprises a body having a top portion which top portion includes a foam pad.

9. The adjustable armrest assembly of claim 6 wherein said cover comprises a body having a top portion which top portion includes a cushioning.

* * * * *